United States Patent
Arramreddy et al.

(10) Patent No.: US 9,338,219 B2
(45) Date of Patent: May 10, 2016

(54) DIRECT PUSH OPERATIONS AND GATHER OPERATIONS

(71) Applicant: Emulex Design & Manufacturing Corporation, Costa Mesa, CA (US)

(72) Inventors: Sujith Arramreddy, Saratoga, CA (US); Anthony Hurson, Austin, TX (US); Ashwin Kamath, Cedar Park, TX (US); Jayaram K. Bhat, Cedar Park, TX (US); James D. Butler, Sierra Madre, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 302 days.

(21) Appl. No.: 13/843,288

(22) Filed: Mar. 15, 2013

(65) Prior Publication Data

US 2014/0280716 A1 Sep. 18, 2014

(51) Int. Cl.
*H04L 29/08* (2006.01)
*H04L 12/861* (2013.01)

(52) U.S. Cl.
CPC ............... *H04L 67/10* (2013.01); *H04L 49/90* (2013.01)

(58) Field of Classification Search
CPC .................................. H04L 67/10; H04L 49/90
See application file for complete search history.

(56) References Cited

U.S. PATENT DOCUMENTS

| | | | |
|---|---|---|---|
| 7,843,906 B1 * | 11/2010 | Chidambaram et al. | 370/386 |
| 2002/0152327 A1 * | 10/2002 | Kagan et al. | 709/250 |
| 2002/0165899 A1 * | 11/2002 | Kagan | G06F 12/1466 718/104 |
| 2004/0172631 A1 * | 9/2004 | Howard | 718/100 |
| 2005/0144310 A1 * | 6/2005 | Biran et al. | 709/234 |
| 2007/0226750 A1 * | 9/2007 | Sharp et al. | 719/313 |

* cited by examiner

*Primary Examiner* — Eric Oberly

(57) ABSTRACT

When interfacing with a host, a networking device can handle a first data like Bulk Data Send. In response to a first doorbell ring, the networking device can read a first queue entry from a send queue in the host. Based on the first queue entry, the networking device can read the first data from a first memory in the host and then output the read first data. The networking device can also handle a second data like Direct Packet Push. The networking device can store a second data received from the host. In response to a second doorbell ring, the networking device can output the second data. The first data and the second data can be associated with first and second queue entries, both on the same send queue in the host. High-throughput and low-latency can be achieved. Small and large data packets can be accommodated.

20 Claims, 8 Drawing Sheets

DIRECT PUSH OPERATIONS AND GATHER OPERATIONS

FIELD OF THE DISCLOSURE

This relates generally to data communication in networks, and more specifically, to transmitting data packets at an intermediate or endpoint node with low-latency and high-bandwidth. The same transmit ring may be utilized.

BACKGROUND OF THE DISCLOSURE

Latency can be described as the amount of time it takes for a packet of data to propagate from a transmitter to a receiver. The total latency includes overhead time for time spent sending and receiving commands and executing reads and writes, and performing additional functions to ensure that the data can reach the correct destination without errors. For large data packets, achieving large bandwidth becomes critical, whereas low latency can be important for small data packets. Reducing the overhead time and therefore the overall latency time for small data packets can help lead to better performance and faster processing in networks and message-based applications.

SUMMARY OF THE DISCLOSURE

This relates to methods and techniques to manage transmitting data packets. Examples of the disclosure can be used to achieve both high-throughput and low-latency. The exemplary teachings of the disclosure can enable Bulk Data Send (BDS) and Direct Packet Push (DPP) to be intermixed, which can accommodate transmitting both small data packets and large data packets across a network.

A networking device can handle a first data in a certain way. The first data may be stored in a first memory. The networking device may comprise logic providing various functions, including those of a queue reader, a data reader, and an interface. In response to a first doorbell ring, the queue reader can read a first queue entry from a send queue. Based on the first queue entry, the data reader can read the first data stored in the first memory. The interface can output the read first data from the networking device. A host may comprise the first memory and the send queue. These teachings can contribute to Bulk Data Send functionality.

The networking device can also handle a second data, yet in a different way. The logic can provide the function of a second memory that can store a second data received from a host. In response to a second doorbell ring, the logic can output the second data from the networking device. The second doorbell can be from the host. These teachings can contribute to Direct Packet Push functionality.

The first data and the second data can be associated with the first queue entry and a second queue entry, respectively. Both the first queue entry and the second queue entry may be stored on the same send queue, which may be in the host. Using the same send queue can allow for flexibility and conservation of memory resources.

In some examples, the handling of the second data can involve the networking device's logic providing a list and a comparison. The list can contain list information that indicates the storing of the second data in the second memory. The logic can compare the list information and an indication of a second queue entry in a send queue, the second queue entry being associated with the second data. Based on the comparison, the logic can output the second data from the networking device in response to the second doorbell ring. Through these teachings, the networking device can decide to handle the second data with DPP functionality.

In some examples, the handling of the first data can involve the networking device's logic providing a list and a comparison. The list can contain list information that indicates the storing of the second data in the second memory. The logic can compare the list information and an indication of a second queue entry in a send queue, the second queue entry being associated with the second data. Based on this comparison, the queue reader can read the first queue entry from the send queue in the first memory in response to the first doorbell ring. Based on the first queue entry, the data reader can read the first data stored in the first memory. Through these teachings, the networking device can decide to handle the second data with BDS functionality.

Some examples may involve a host operating a single doorbell of the networking device in the first doorbell ring and in the second doorbell ring. The networking device may be incorporated in a networking adapter (e.g., a NIC, an Ethernet card, a host bus adapter (HBA), a CNA) or in a host. The host may incorporate the networking adapter. The various examples may be provided in a network, as well. Additional examples include machine-readable media that implement the methods of this disclosure.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

This relates to methods and techniques to manage transmitting data packets for both high-throughput and low-latency operation, for applications such as high performance computing and message-based applications. One way to transmit the data packets is by using Bulk Data Send where the host software stores the data packet in a data buffer located in host memory and writes the location of the stored data packet in a queue to be later accessed by a networking device. A solution to achieving low latency for transmitting small data packets in networking device can be to utilize Direct Packet Push, where the host software pushes the data directly to a data buffer located on a networking device. Examples of the disclosure can be used to achieve higher performance with low overhead time and low overall latency when a networking device transmits a small data packet, and to achieve high bandwidth when a networking device transmits a large data packet. Bulk Data Send and Direct Packet Push can be intermixed and can share the same transmit ring to accommodate transmitting both small data packets and large data packets for transmitting across a network.

Achieving low latency and high bandwidth for data sent in a network can be an important aspect of proper network operation. Managing the way a data packet can be sent can help, for example, to reduce latency, which is defined herein as the total time measured from the start of a data packet transmitted from a networking endpoint or node to when the data packet has been received at another networking endpoint or node. This management can have significant impact on the performance of the network, especially for communications numbering in the low thousands, or higher.

Figure 1:
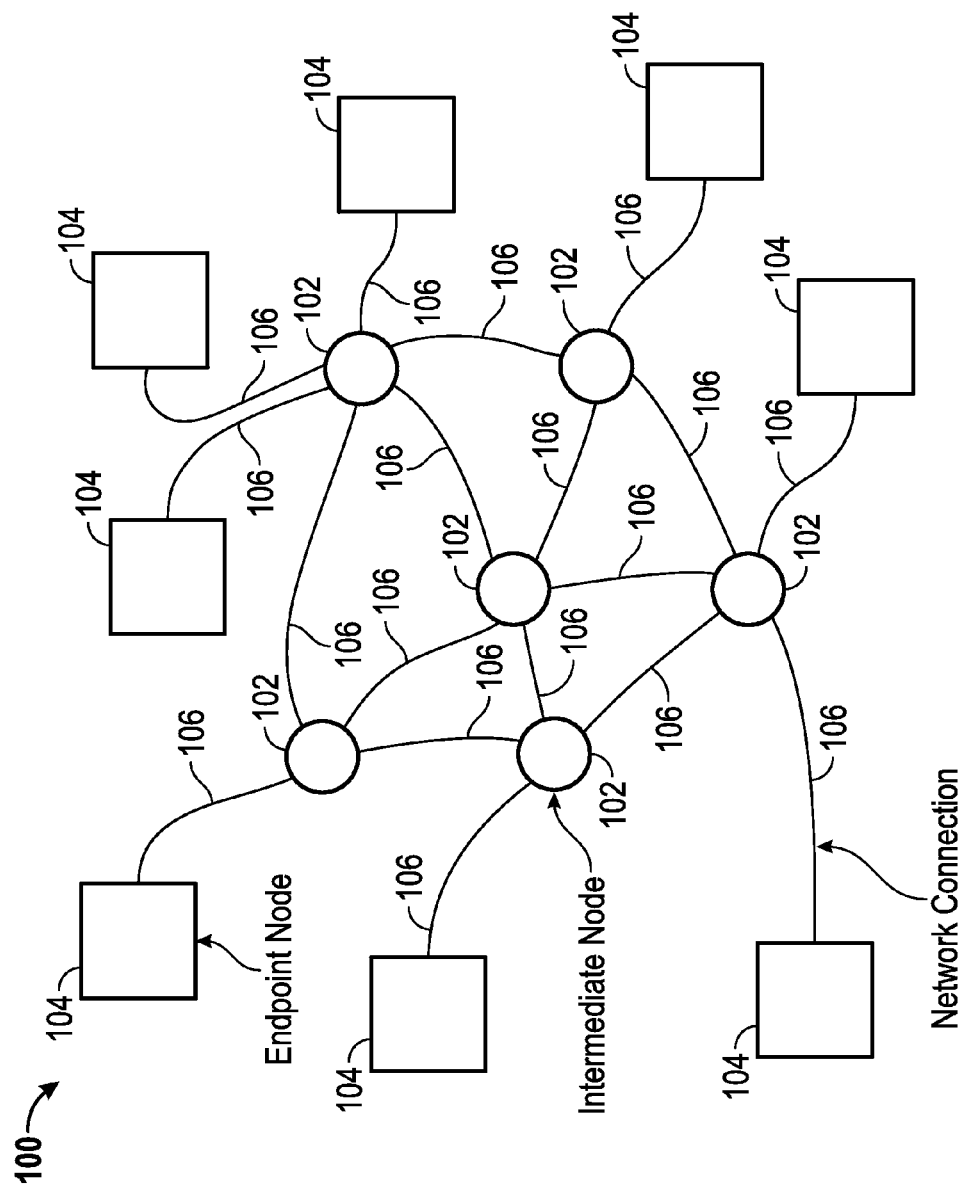
FIG. 1 illustrates an exemplary network in which examples of this disclosure may be practiced.

FIG. 1 illustrates an exemplary network 100 in which examples of this disclosure may be practiced. The network 100 can include various intermediate nodes 102. These intermediate nodes 102 can be devices such as switches or hubs, or other devices. The network 100 can also include various endpoint nodes 104. These endpoint nodes 104 can be computers, mobile devices, servers, storage devices, or other devices. The intermediate nodes 102 can be connected to other intermediate nodes and endpoint nodes 104 by way of various network connections 106. These network connections 106 can be, for example, Ethernet-based, Fibre Channel-based, or can be based on any other type of communication protocol.

The endpoint nodes 104 in the network 100 can transmit and receive data to one another through network connections 106 and intermediate nodes 102. However, high latency and long times needed to transmit the data from one endpoint node 104 to an intermediate node 102 or another endpoint node 104 can result under certain circumstances. For example, when the data packets are small in size and multiple data packets are being transmitted, each data packet can have an overhead time associated with sending and receiving commands, executing reads and writes, and performing additional functions to ensure that the data can reach the correct destination without errors. The sum of the total overhead time for all the small data packets can constitute a large portion of the total latency time. This, in turn, can result in inefficient communication rates and poor performance.

Although the examples of this disclosure focus on managing data transmitted at an endpoint node 104 in a network 100, the scope of this disclosure also extends to managing data transmitted in the middle of a network, such as from an intermediate node 102.

Figure 2:
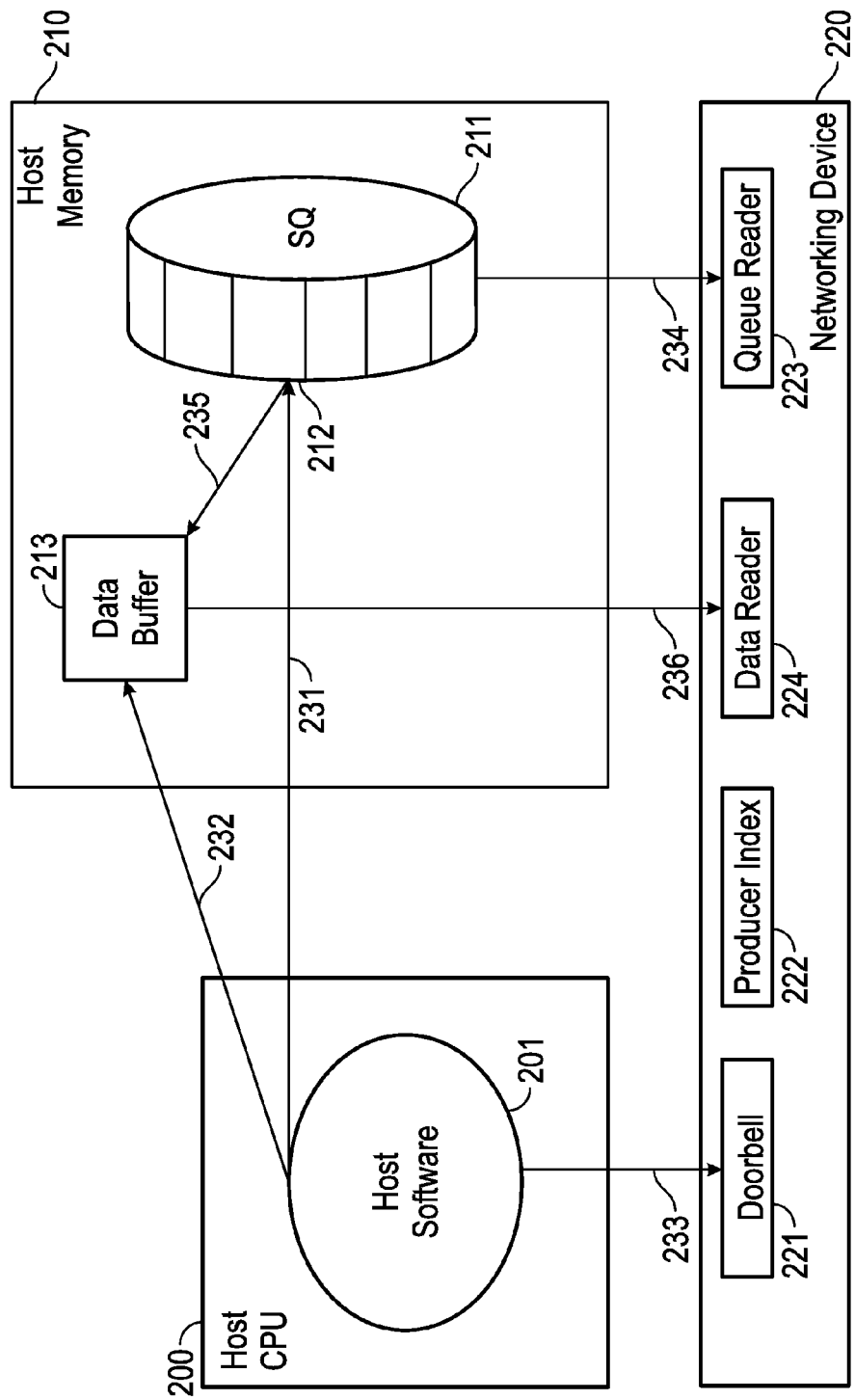
FIG. 2 illustrates exemplary data packet transmission using Bulk Data Send.

In a networking system, transmitting a data packet can be initiated by host software that notifies a networking device of work to be performed through a function call. The host software can maintain one or more queues with entries corresponding to the data packets to be transmitted. One way to transmit data packets can be Bulk Data Send (BDS) as shown in FIG. 2. Host software 201 can be run by a host CPU 200. Host software 201 can send a data packet to a networking device 220 for transmission by creating a write-combine bar (WRB) entry comprising a WRB header and one or more scatter/gather elements (SGEs). The host software 201 can then write the WRB entry 212 into a send queue (SQ) 211 located in host memory 210. A SQ can be a circular ring or non-circular ring, can implement any type of buffering scheme such as First In-First Out (FIFO), and can be maintained by host software 201. Host software 201 can post the WRB entry 212 to the SQ 211, shown by arrow 231, for the networking device 220 to retrieve. Host software 201 can also post the data packet in a data buffer 213 in host memory 210, shown by arrow 232. Host software 201 can ring the doorbell, shown by arrow 233, by writing a value into a doorbell register 221. The doorbell register 221 can be an allocated address space located in the networking device 220 that can be used as a mechanism to notify the networking device 220 when a transmit operation has been requested by host software 201. The doorbell register can comprise an SQ number and the number of transmission requests. The networking device 220 can then increment its producer index 222 by the number of transmission requests by host software 201, based on the number of times the doorbell register 221 was written to. The producer index can be a value maintained by the networking device 220 that can be used to keep track of the number of sends that have been requested for work. From the information in the doorbell register 221, the networking device 220 can determine which SQ to access by a read operation. The networking device 220 can perform a read of the SQ 211, shown by arrow 234, by a queue reader 223 to retrieve the WRB entry 212. Using the information in WRB entry 212, the networking device can use the pointer information, shown by arrow 235, given in the one or more SGEs of the WRB entry 212 to retrieve the data packet from a data buffer 213 located in host memory 210, shown by arrow 236. Retrieving the data packet can be performed by a data reader 224 located in the networking device 220.

One characteristic of BDS can be the large overhead associated with the networking device reading the WRB entry from the SQ and also the extra time for fetching the data packet from the data buffer in host memory. This can lead to the overhead time consuming a significant portion of the total latency time for small data packet transmissions. For large data packets, the overhead time can be minimal relative to the actual time to transmit the data, so minimizing the overhead time may not have as large of an impact. However, for small data packets, minimizing the overhead time can lead to a large impact on overall performance and time.

Figure 3:
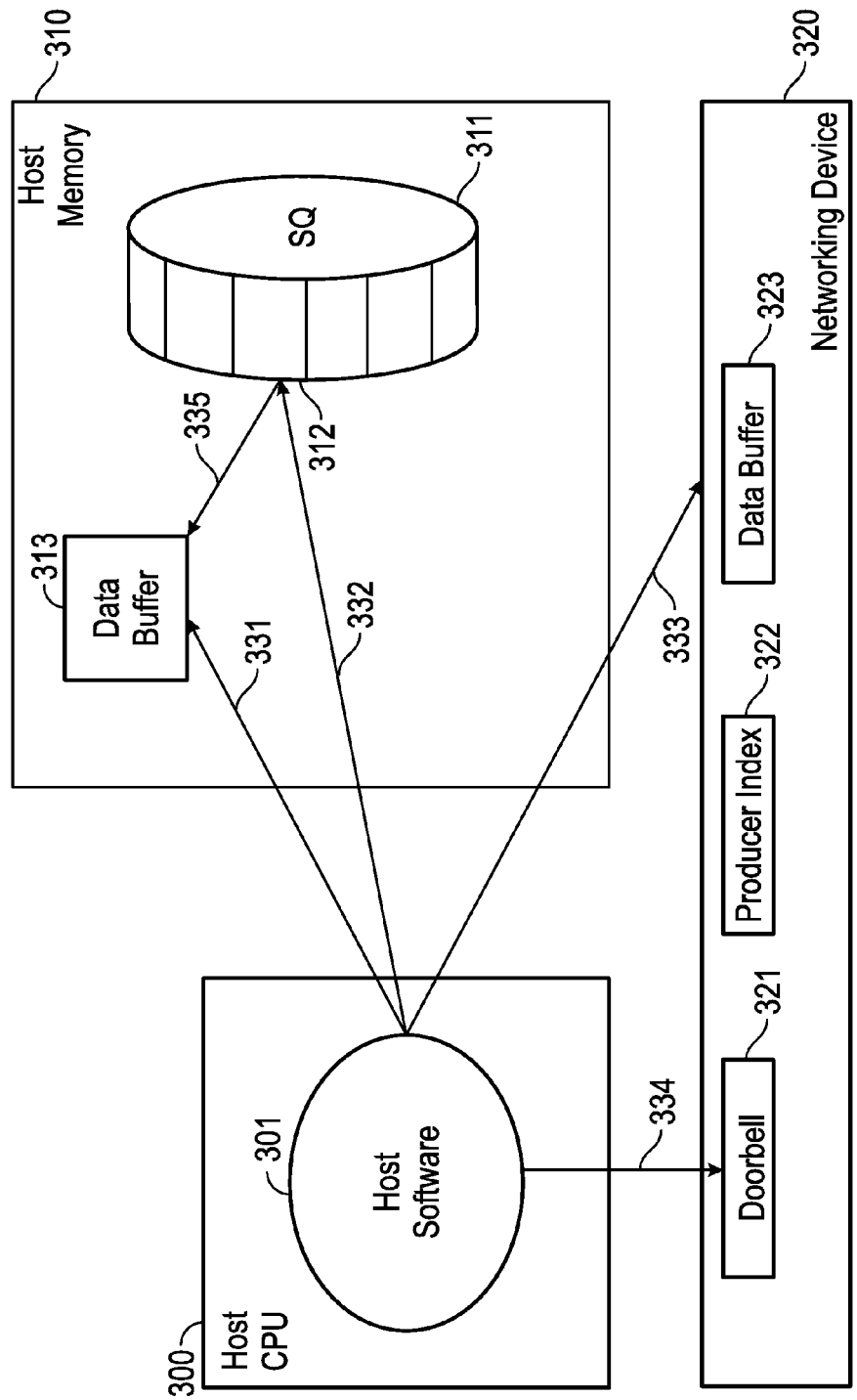
FIG. 3 illustrates exemplary data packet transmission using Direct Packet Push.

Another method used for transmitting data can be Direct Packet Push (DPP), as shown in FIG. 3. Host software 301 can be run by host CPU 300 and can create a WRB entry 312 comprising a WRB header and one or more SGEs. Host software 301 can push the WRB entry 312 onto an SQ 311, shown by arrow 332, located in host memory 310. A copy of the data packet can be made in a data buffer 313, shown by arrow 331, also located in host memory 310. The copy can be added for redundancy or can be used in situations where the directly pushed data gets dropped, such as when resources on the networking device 320 are unavailable. An SGE of the WRB entry 312 can point, shown by arrow 335, to the data buffer 313. Host software 301 can push a copy of both the WRB entry 312 and data packet in one write-combine operation directly to the networking device 320, shown by arrow 333. Host software 301 can ring the doorbell 321, shown by arrow 334, by writing to the doorbell register 321 indicating to the networking device that a data packet is ready for transmission. Networking device 220 can place the data packet in a data buffer 323 or can drop the data packet. The networking device 220 can update its own producer index 322 to keep track of the number of sends or transmits that have been requested for work.

Overhead time can be lower for DPP compared to BDS because of allowing the host software to push the data packet directly to the networking device, instead of having the networking device pull the data packet from host memory. While DPP may be beneficial for transmitting small data packets, the amount of memory or space in the data buffers located on the networking device can be limited. Large data packets can be larger than the size of the entries in the data buffer on the networking device and can be broken up into smaller packets to be transmitted using multiple send commands. Utilizing multiple send commands for one data packet can lead to lower performance for large data packet transmission, where high bandwidth can be desired.

Achieving both low latency for transmitting small data packets and high bandwidth for transmitting large data packets can be done by combining both techniques previously presented: BDS and DPP. The two techniques can be intermixed and the same SQ can be utilized for both. By intermixing the two techniques and ensuring orderly scheduling, the performance for applications, such as high performance computing and message-based applications, can be enhanced without loss of data and with minimal resource consumption.

For large data packets, BDS can be used since the percentage of overhead time may not constitute a significant portion of the total latency time and the DPP method can lead to low bandwidth due the breakup of the large data packets into multiple data packets and transmitting the data packets using multiple send commands. For small data packets, the overhead time with BDS can constitute a significant amount of the total latency time, so DPP can then be used instead to achieve lower overhead and latency time. In BDS, a large percentage of the overhead can come from the SQ read and also from fetching the packet data from host memory. DPP can alleviate some of the issues with large latency associated with BDS by bypassing the time the networking device uses to retrieve the data packet from host memory.

Additionally, BDS can be used when resources on the networking device may be unavailable. The location where data packets are stored for the DPP method, also known as the data buffer in the networking device, may be oversubscribed, for example, when many data packets are being pushed from the host software. When networking device resources are available, DPP can be used so that many data packets can be stored in the data buffer and later transmitted. However, when there are insufficient device resources, BDS can be used to transmit the small data packets. For example, when the data buffer is full, the data pushed from the host software can be dropped. When the processor in the networking device is ready to send the dropped data packet, the networking device can then use BDS to retrieve the corresponding copy of the dropped data packet from the data buffer located in host memory and transmit the data packet.

Figure 4:
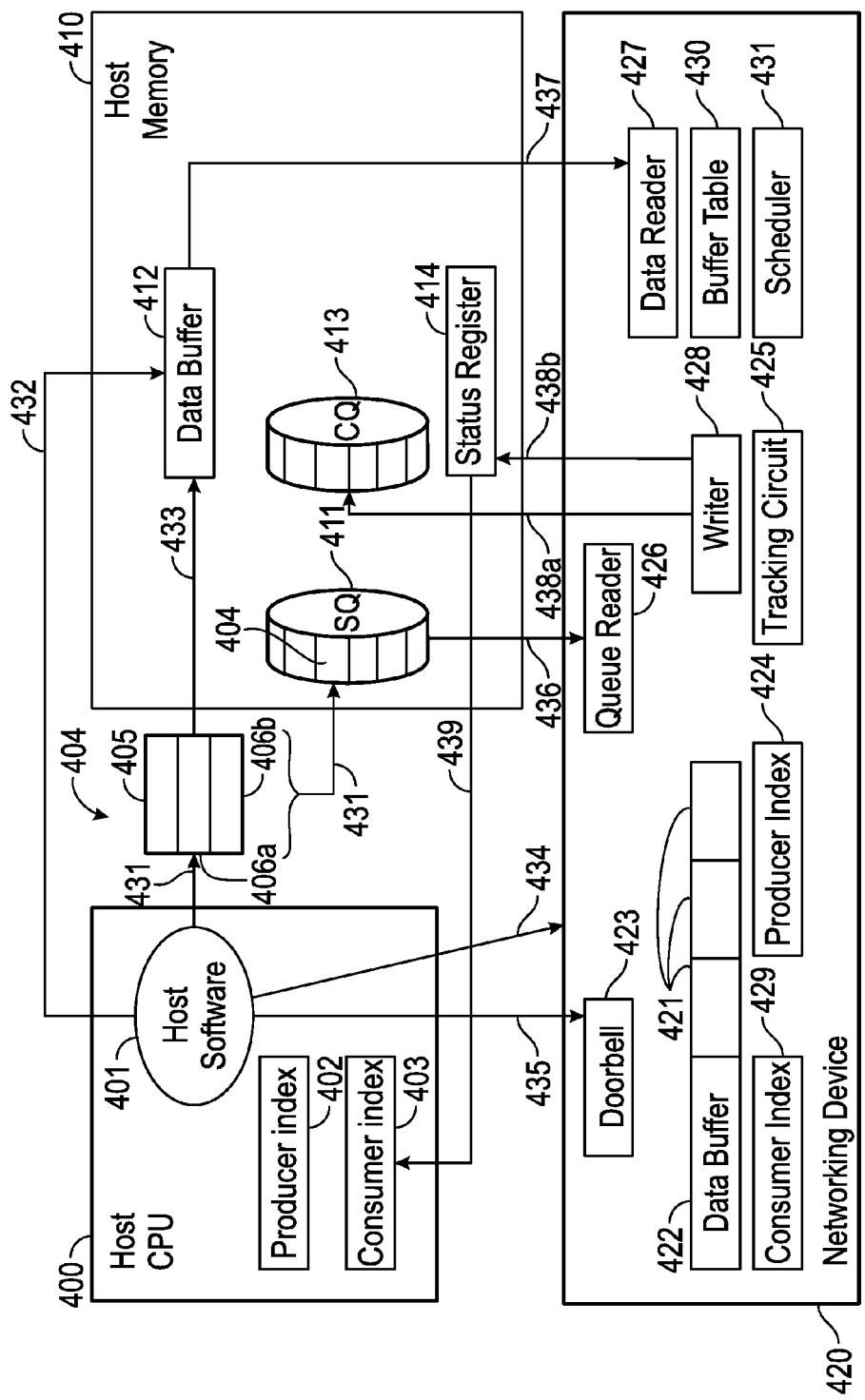
FIG. 4 illustrates exemplary data packet transmission using Bulk Data Send and Direct Packet Push.

An example system of BDS and DPP intermixed using the same send queue is shown in FIG. 4. Using the same send queue for WRB entries for data packets transmitted by both BDS and DPP can allow for flexibility and conservation of memory resources. The host software 401 located in host CPU 400 can create a WRB entry 404 comprising a WRB header 405 and multiple SGEs 406a/406b. The WRB header 405 can comprise the total byte count of the WRB entry 404 and can be indicative of the size of the data packet. WRB entry 404 can be written in an SQ 411, shown by arrow 431. A copy of the data packet can be made in a data buffer 412 in host memory 410, shown by arrow 432, and SGEs, such as SGE 406a, in the WRB entry 404 can point, shown by arrow 433, to the copy located in the data buffer 412 in host memory 410. The data buffer 412 can be used for redundancy or can be used for BDS sends, such as in situations where the directly pushed data gets dropped or for large data packet transmission or when networking resources were unavailable. In some instances, host software 401 can push a data packet, a WRB entry, and a DPP table offset in one write-combine operation, shown by arrow 434, directly onto the networking device 420.

Figure 5:
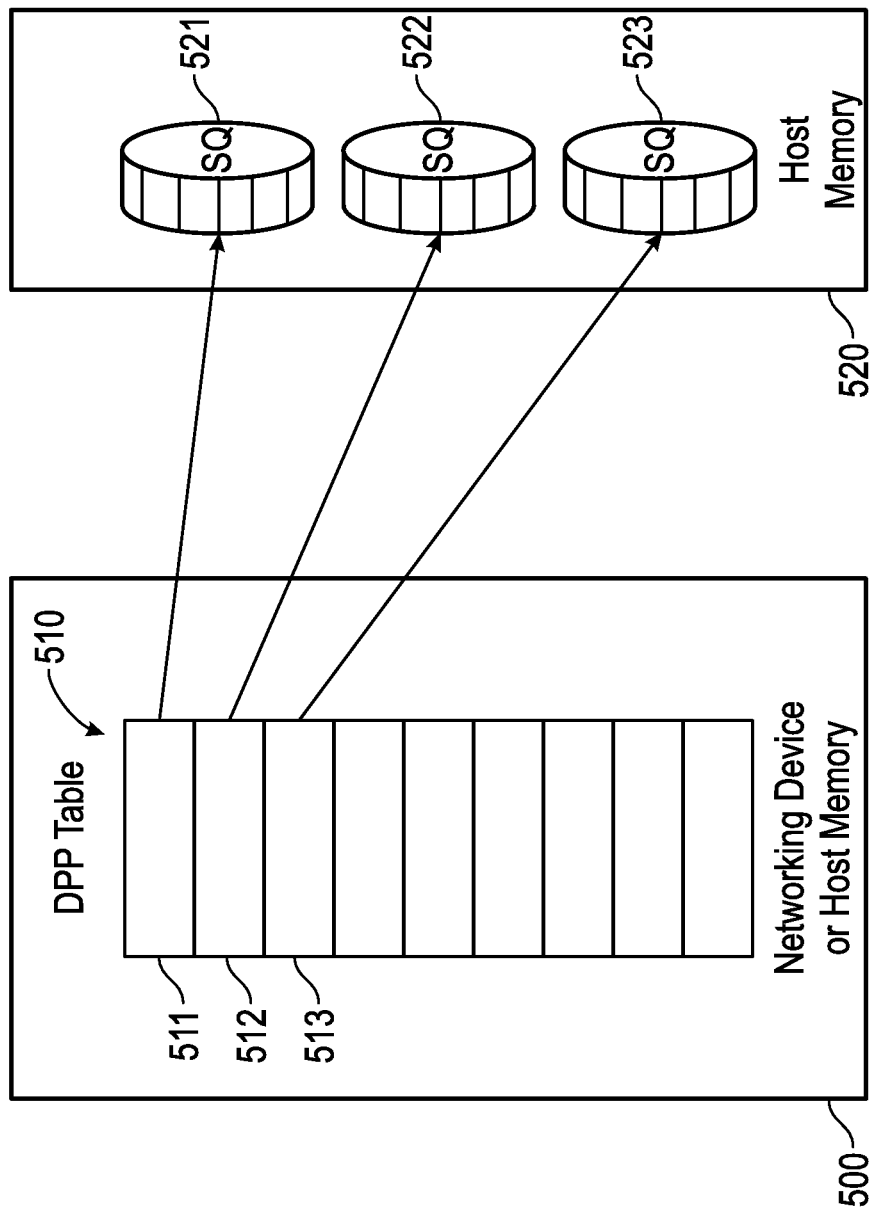
FIG. 5 illustrates an exemplary data page located in a networking device and associated send queues located in host memory.

A DPP table offset is a value corresponding to a DPP table, as shown in FIG. 5. The DPP table 510 can be located on the networking device or in host memory 500. The DPP table 510 can comprise offset values 511/512/513 that point to a particular SQ 521/522/523 located in host memory 520.

Referring back to FIG. 4, host software 401 can ring the doorbell 423, shown by arrow 435, by writing to the doorbell register 423 located on the networking device 420. The doorbell register 423 can be a mechanism to inform the networking device 420 of transmission requests and can include the SQ number. Host CPU 400 can increment its producer index 402 to keep track of the number of transmission requests made to the networking device 420. When the doorbell register 423 has been written to, the networking device 420 can also update its own producer index 424 to keep track of how many transmission requests were pushed by host software 401, and the number of outstanding work requests can be determined using a consumer index 429. If the doorbell register 423 was written to and there were no data packets pushed in the write-combine operation, shown by arrow 434, the networking device 420 can determine that the data packet can be transmitted using the BDS method. If the doorbell register 423 was written and at least one data packet was pushed in the write-combine operation, the networking device can determine that the data packet can be transmitted using the DPP method. If the doorbell register 423 was written to once and more than one data packet was pushed, the networking device 420 can determine that the data packet constitutes multiple entities. The networking device 420 can decide to store the information from the write-combine operation in its own data buffer 422 or the networking device 420 can drop the information from the write-combine operation. To store the data packet from the write-combine operation, the networking device 420 can use the DPP data offset and its own buffer table 430, located internally, to determine the SQ number and location of where to store the data packet 421 in the data buffer 422. The networking device 420 can schedule the work using its scheduler 431 and can update its tracking circuit 425 and consumer index 429.

Figure 6:
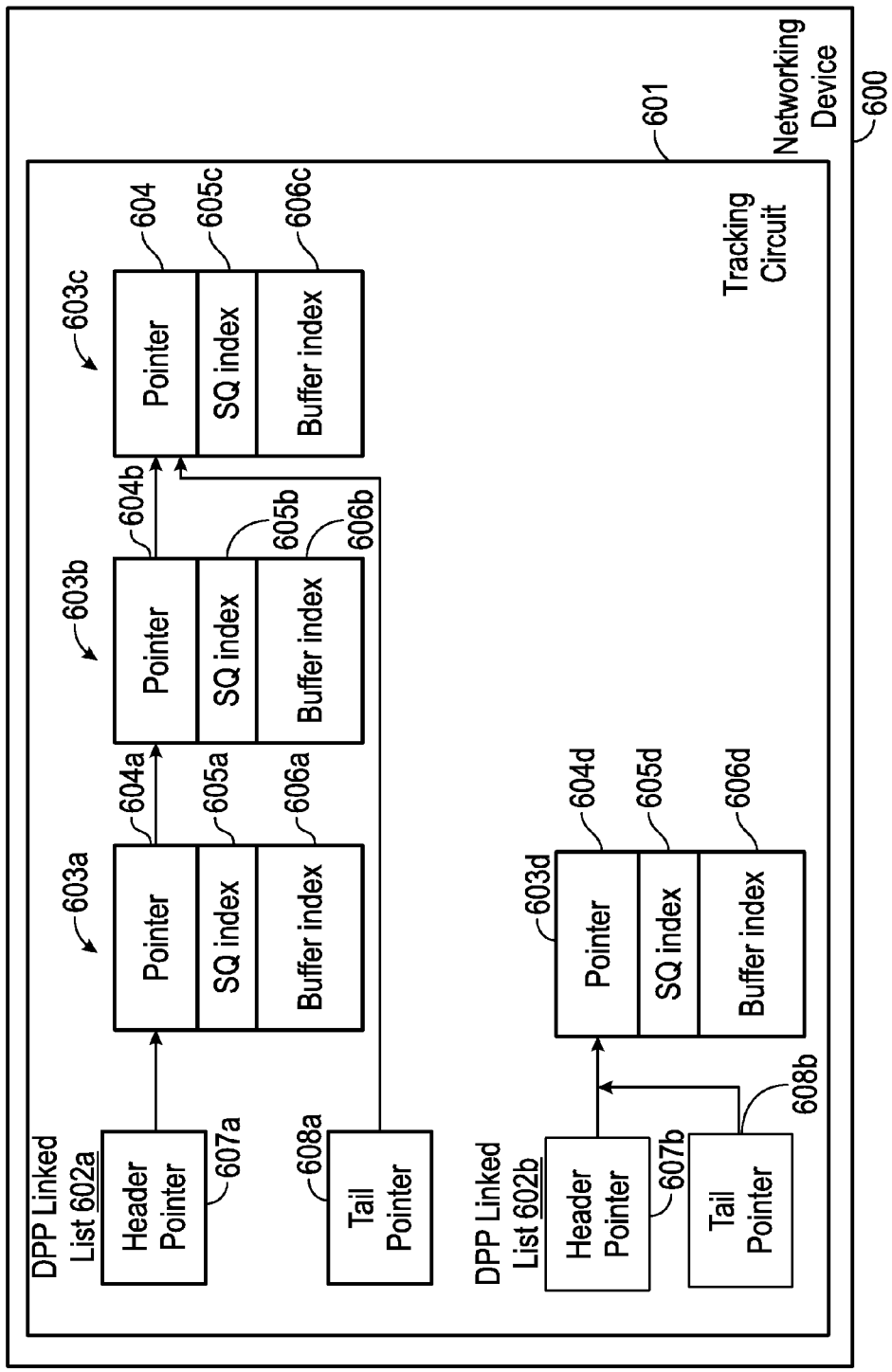
FIG. 6 illustrates an exemplary linked list of an internal tracking circuit located in a networking device.

Maintaining the order of the transmit commands and data packets can be important. An internal tracking circuit can be located on the networking device to be used for this. The internal tracking circuit can keep track of data packets that have not yet been sent, whether to use BDS or DPP to transmit the data packet, a pointer to the SQ index for the corresponding WRB entry, and a pointer to the DPP data buffers for DPP sends. The tracking circuit can comprise of any type of ordering system such as First In-First Out (FIFO). An example tracking circuit 601 located in networking device 600 is shown in FIG. 6. A DPP linked list 602a/602b can be comprise of multiple entries, wherein an entry can be created for data packets stored in the data buffer, such as entry 421 in the data buffer 422, previously shown in FIG. 4. A linked list may exist for each SQ. For example, the entry 603a in DPP linked list 602a can comprise a SQ index number 605a, the buffer index 606a where the data packet was landed in the data buffer of the networking device and a pointer 604a to the next entry in the linked list. The DPP linked list 602a/602b can also have a header pointer 607a/607b and a tail pointer 608a/608b, as shown. An SQ can have an associated linked list indicating data which has been designated for DPP Sends for that particular SQ. For example, DPP linked list 602a can be associated with one SQ located in host memory and DPP linked list 602b can be a separate linked list associated with a different SQ located in host memory. Entries not located in the linked list, but located in the SQ, can be an indication that data packet was not yet sent and the BDS method should be performed. The difference between the value of the producer index, indicated by 424 of FIG. 4, and the number of entries in the linked list can also reflect the number of sends to be transmitted using the BDS method. When the networking device 600 has transmitted the data packet using DPP, the entry 603a/603b/603c can be removed from the DPP linked list 602a/602b and the data packet removed from the corresponding data buffer in the networking device, which can then be used for future DPP incoming data packets.

Figure 7:
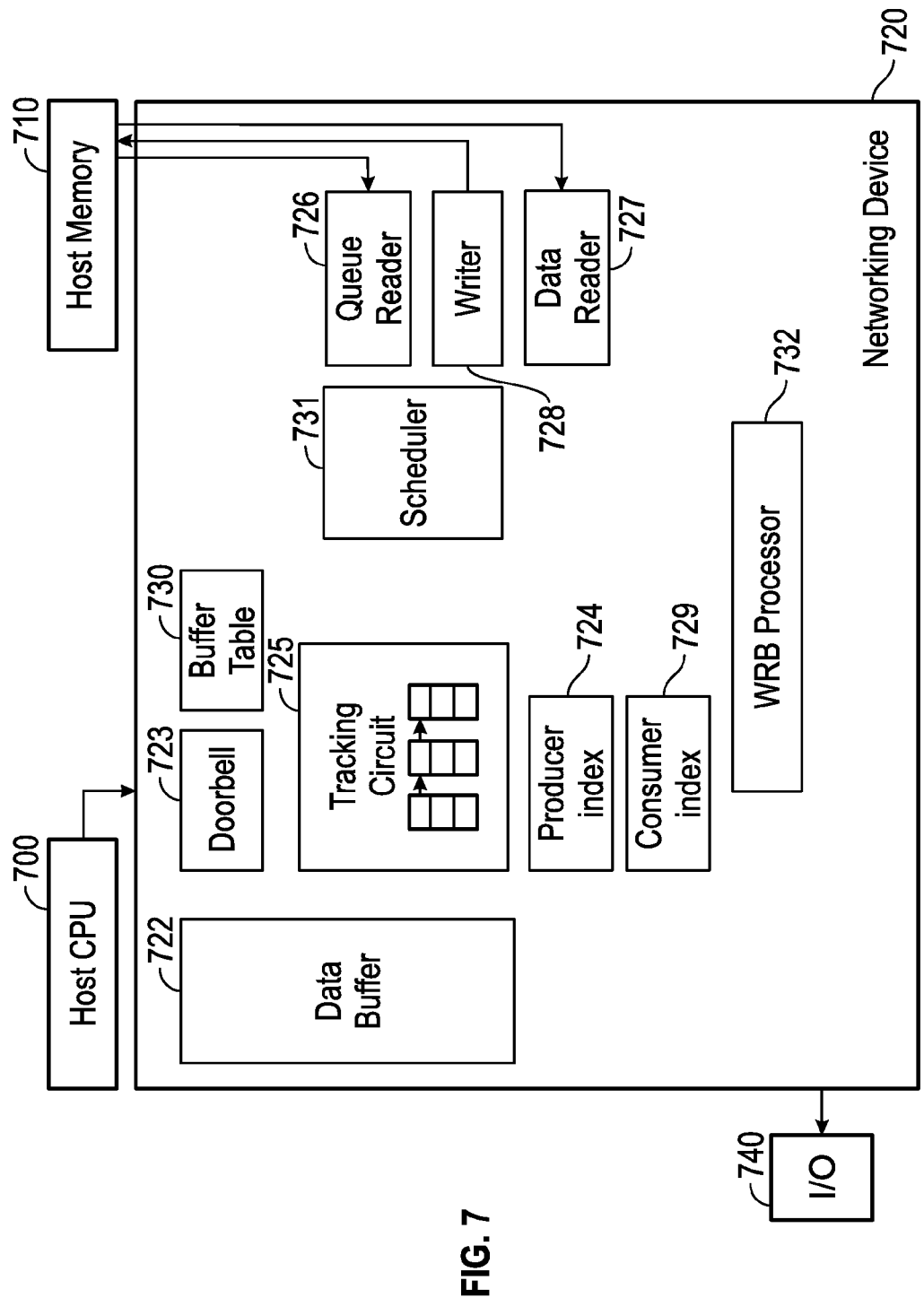
FIG. 7 illustrates an exemplary networking device and internal components.

An example networking device 720 is given in FIG. 7. The doorbell register 723 can be written to by host software of host CPU 700 to notify the networking device 720 of a data packet that has been requested to be transmitted. The doorbell register 723 can include the SQ number and can indicate the number of transmission requests received by host CPU 700. The producer index 724 can be updated when the doorbell register 723 has been written to and can be used in conjunction with the consumer index 729 as an indicator to the networking device 720 that one or more outstanding work requests exist. The networking device 720 can schedule the transmission request using the scheduler 731.

If a write-combine operation was received by host software in host CPU 700 and the data buffer 722 is not full, the data packet can be later transmitted using DPP. The write-combine operation can comprise of the data packet, WRB entry, and buffer table offset. A buffer table 730 can be used to translate an offset number to determine the SQ number and location of where to land the data packet in the data buffer 722. The networking device 720 can store the data packet and WRB header into the data buffer 722 and can update the linked list in the tracking circuit 725. The tracking circuit 725 can comprise one or more linked lists to be used to reflect any outstanding transmission requests to be transmitted using DPP, which SQ number the WRB entry was written to by host software, and the location of where the data packet was stored in data buffer 722. If a write-combine operation was not received by host software or if the data buffer 722 is full, any received data packets can be dropped and the request can be scheduled using the scheduler 731 and the producer index 724 can be updated.

When the transmission is ready to be executed, the networking device 720 can check for a match between the linked list entry and a WRB index indicating the WRB entry in the SQ. This check can be performed by WRB processor 732. If there is a match, the transmission request can be transmitted using DPP. The linked list entry can be removed from the linked list in the tracking circuit 725 and the entry can point to the location of the WRB header and data packet in the data buffer 722. The networking device 720 can pull the WRB header information from the data buffer 722 to prepare for transmission. The networking device 720 can then retrieve the data packet from the data buffer 722 and assemble the data packet to be sent to I/O 740.

If there is not a match between the linked list entry and the WRB index indicating the WRB entry in the SQ, the transmission request can be transmitted using BDS. Referring to both FIG. 4 and FIG. 7, the networking device 720 can retrieve the WRB entry 404 from SQ 411, by performing a read, shown by arrow 436, using the queue reader 426/726. The WRB entry 404 can comprise SGEs 406a/406b pointing to the data buffer 412 located in host memory 410, where the data packet was stored previously by host software 401. The networking device 420/720 can perform a read of the data buffer 412 located in host memory 410, shown by arrow 437, using the data reader 427/727. With the retrieved data packet, the networking device 420/720 can execute the send to I/O 740.

When the data packet is sent to I/O 740, the networking device 420/720 can update its consumer index 429/729 and notify host CPU 400/700 that the send has been completed by performing a write, shown by arrow 438a, to either a CQ 413 or a status register 414 located in host memory 410, using queue writer 428/728. In response, host software can update its consumer index 403.

Figure 8:
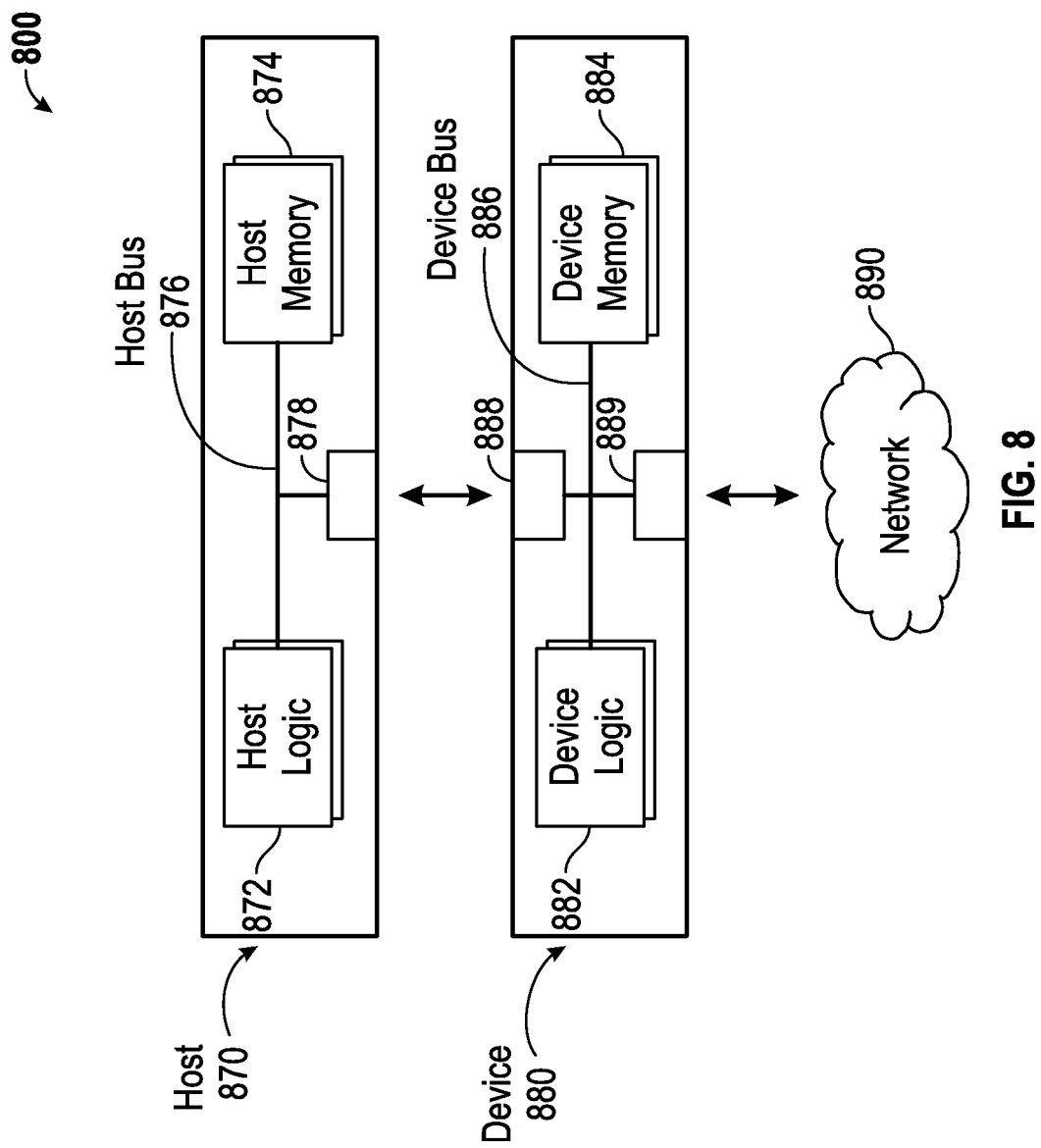
FIG. 8 illustrates an exemplary networking system that can be used with one or more examples of this disclosure.

FIG. 8 illustrates an exemplary networking system 800 that can be used with one or more examples of this disclosure. Networking system 800 may include host 870, device 880, and network 890. Host 870 may include a computer, a server, a mobile device, or any other devices having host functionality. Device 880 may include a network interface controller (NIC) (similarly termed as network interface card or network adapter), such as an Ethernet card, a host bus adapter (as for Fibre Channel), a converged network adapter (CNA) (as for supporting both Ethernet and Fibre Channel), or any other device having networking device functionality. Network 890 may include a router, a switch, transmission medium, and other devices having some network functionality.

Host 870 may include one or more host logic 872, a host memory 874, an interface 878, interconnected by one or more host buses 876. The functions of the host in the examples of this disclosure may be implemented by host logic 872, which can represent any set of processors or circuitry performing the functions. Host 870 may be caused to perform the functions of the host in the examples of this disclosure when host logic 872 executes instructions stored in one or more machine-readable storage media, such as host memory 874. Host 870 may interface with device 880 via interface 878.

Device 880 may include one or more device logic 882, a device memory 884, interfaces 888 and 889, interconnected by one or more device buses 886. The functions of the networking device in the examples of this disclosure may be implemented by device logic 882, which can represent any set of processors or circuitry performing the functions. Device 880 may be caused to perform the functions of the networking device in the examples of this disclosure when device logic 882 executes instructions stored in one or more machine-readable storage media, such as device memory 884. Device 880 may interface with host 870 via interface 888 and with network 890 via interface 889. Device 880 may be a CPU, a system-on-chip (SoC), a NIC inside a CPU, a processor with network connectivity, an HBA, a CNA, or a storage device (e.g., a disk) with network connectivity.

Applications for the one or more examples of the disclosure can include, but are not limited to, desktop computers, massive data centers, and high performance computing applications. Although examples disclosed herein may be described and illustrated in terms of single network connections, it should be understood that the examples are not so limited, but are additionally applicable to single receive queues (SRQs) by multiple connections.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

What is claimed is:

1. A networking device for interfacing with a host, the networking device comprising:
  a doorbell register;
  a queue reader configured to determine that the host has written a value into the doorbell register, to correlate the value with one of multiple queues maintained at the host, and to select an entry from the queue; and a tracking circuit configured to determine whether data for the entry was pushed from the host to a buffer at the networking device, and to direct the networking device to:
transmit the data for the entry to another device via Bulk Data Send (BDS) if the data for the entry was not pushed to the buffer, and
transmit the data for the entry to the other device via Direct Packet Push (DPP) if the data for the entry was pushed to the buffer.

2. The networking device of claim 1, wherein the tracking circuit is configured to determine whether the entry is indicated in a DPP linked list.

3. The networking device of claim 1, wherein:
the tracking circuit is configured to identify a linked list associated with the queue, and to review the linked list to identify entries in the queue that have been flagged for handling via DPP.

4. The networking device of claim 3, wherein:
the tracking circuit is further configured to update the linked list in response to transmitting the data for the entry via DPP.

5. The networking device of claim 1, wherein:
the value includes an identifier that distinguishes the queue from other queues at the host.

6. A networking adapter incorporating the networking device of claim 1.

7. The networking device of claim 1, wherein:
the tracking circuit is configured to identify a number of transmission requests from the host by analyzing the value.

8. The networking device of claim 1, wherein:
the tracking circuit is configured to schedule the data for later transmission.

9. A method for operating a network device interfacing with a host, the method comprising:
determining that the host has written a value into a doorbell register at the network device;
correlating the value with one of multiple queues maintained at the host;
selecting an entry from the queue;
determining whether data for the entry was pushed from the host to a buffer at the networking device;
transmitting the data for the entry to another device via Bulk Data Send (BDS) if the data for the entry was not pushed to the buffer; and
transmitting the data for the entry to the other device via Direct Packet Push (DPP) if the data for the entry was pushed to the buffer.

10. The method of claim 9, further comprising:
determining whether the entry is indicated in a DPP linked list.

11. The method of claim 9, further comprising:
identifying a linked list is associated with the queue; and
reviewing the linked list to identify entries in the queue that have been flagged for handling via DPP.

12. The method of claim 11, further comprising:
updating the linked list in response to transmitting the data for the entry via DPP.

13. A non-transitory machine-readable medium storing instructions that, when executed by one or more processors, cause the apparatus to perform a method for operating a network device interfacing with a host, the method comprising:
determining that the host has written a value into a doorbell register at the network device;
correlating the value with one of multiple queues maintained at the host;
selecting an entry from the queue;
determining whether data for the entry was pushed from the host to a buffer at the networking device;
transmitting the data for the entry to another device via Bulk Data Send (BDS) if the data for the entry was not pushed to the buffer; and
transmitting the data for the entry to the other device via Direct Packet Push (DPP) if the data for the entry was pushed to the buffer.

14. The non-transitory machine-readable medium of claim 13, wherein the method further comprises:
determining whether the entry is indicated in a DPP linked list.

15. The non-transitory machine-readable medium of claim 13, wherein the method further comprises:
identifying a linked list is associated with the queue; and
reviewing the linked list to identify entries in the queue that have been flagged for handling via DPP.

16. The non-transitory machine-readable medium of claim 15, wherein the method further comprises:
updating the linked list in response to transmitting the data for the entry via DPP.

17. The non-transitory machine-readable medium of claim 13, wherein the method further comprises:
identifying a number of transmission requests from the host by analyzing the value.

18. The non-transitory machine-readable medium of claim 13, wherein the method further comprises:
scheduling the data for later transmission.

19. The method of claim 9, further comprising:
identifying a number of transmission requests from the host by analyzing the value.

20. The method of claim 9, further comprising:
scheduling the data for later transmission.

* * * * *